(12) United States Patent
Silver et al.

(10) Patent No.: US 12,153,140 B2
(45) Date of Patent: Nov. 26, 2024

(54) ENHANCED DEPTH MAPPING USING VISUAL INERTIAL ODOMETRY

(71) Applicant: APPLE INC., Cupertino, CA (US)

(72) Inventors: David Silver, Haifa (IL); Eitan Hirsh, Ramat Hasharon (IL); Moshe Laifenfeld, Haifa (IL); Tal Kaitz, Kiryat Ono (IL)

(73) Assignee: APPLE INC., Cupertino, CA (US)

( * ) Notice: Subject to any disclaimer, the term of this patent is extended or adjusted under 35 U.S.C. 154(b) by 917 days.

(21) Appl. No.: 17/268,961

(22) PCT Filed: Sep. 2, 2019

(86) PCT No.: PCT/US2019/049253
§ 371 (c)(1),
(2) Date: Feb. 17, 2021

(87) PCT Pub. No.: WO2020/068377
PCT Pub. Date: Apr. 2, 2020

(65) Prior Publication Data
US 2021/0270969 A1  Sep. 2, 2021

Related U.S. Application Data

(60) Provisional application No. 62/735,864, filed on Sep. 25, 2018.

(51) Int. Cl.
*G01S 17/89* (2020.01)
*G01S 7/4863* (2020.01)
(Continued)

(52) U.S. Cl.
CPC ............ *G01S 17/89* (2013.01); *G01S 7/4863* (2013.01); *G01S 17/10* (2013.01); *G01S 17/58* (2013.01); *G01S 17/86* (2020.01)

(58) Field of Classification Search
CPC ........ G01S 17/89; G01S 17/58; G01S 7/4863; G01S 17/10; G01S 17/86; G01S 7/4808; G01S 7/4865
(Continued)

(56) References Cited

U.S. PATENT DOCUMENTS 8,456,517 B2   6/2013 Spektor et al.
8,786,678 B2   7/2014 Schmidt et al.
(Continued)

FOREIGN PATENT DOCUMENTS

CN    106772430 A    5/2017
WO    2009059391 A1  5/2009
(Continued)

OTHER PUBLICATIONS

EP Application # 19769672.7 Office Action dated Jun. 7, 2023.
(Continued)

*Primary Examiner* — Daniel L Murphy
(74) *Attorney, Agent, or Firm* — MEITAR PATENTS LTD.

(57) ABSTRACT

Imaging apparatus (22) includes a radiation source (40), which emits pulsed beams (42) of optical radiation toward a target scene (24). An array (52) of sensing elements outputs signals indicative of respective times of incidence of photons on the sensing elements. Objective optics (54) form a first image of the target scene on the array of sensing elements. An image sensor (64) captures a second image of the target scene. Processing and control circuitry (56, 58) is configured to process the second image so as to detect a relative motion between at least one object in the target scene and the apparatus, and which is configured to construct, responsively to the signals from the array, histograms of the times of incidence of the photons on the sensing elements and to adjust the histograms responsively to the
(Continued)

detected relative motion, and to generate a depth map of the target scene based on the adjusted histograms.

20 Claims, 5 Drawing Sheets (51) Int. Cl.
  *G01S 17/10* (2020.01)
  *G01S 17/58* (2006.01)
  *G01S 17/86* (2020.01)
(58) Field of Classification Search
  USPC ........................................................ 356/5.01
  See application file for complete search history.

(56) References Cited

U.S. PATENT DOCUMENTS

| | | |
|---|---|---|
| 9,525,863 B2 | 12/2016 | Nawasra et al. |
| 9,582,889 B2 | 2/2017 | Shpunt et al. |
| 9,997,551 B2 | 6/2018 | Mandai et al. |
| 10,324,171 B2 | 6/2019 | Niclass et al. |
| 10,605,916 B2 | 3/2020 | Molnar et al. |
| 10,620,300 B2 | 4/2020 | Sharma et al. |
| 2014/0064555 A1 | 3/2014 | Sebastian et al. |
| 2016/0249039 A1 | 8/2016 | Tran et al. |
| 2017/0272651 A1 | 9/2017 | Mathy et al. |
| 2018/0096489 A1 | 4/2018 | Cohen et al. |
| 2018/0232947 A1 | 8/2018 | Nehmadi et al. |
| 2018/0249143 A1 | 8/2018 | Calpe Maravilla et al. |
| 2019/0041503 A1* | 2/2019 | Shand .................... G01S 17/42 |

FOREIGN PATENT DOCUMENTS

| | | |
|---|---|---|
| WO | 2017112416 A1 | 6/2017 |
| WO | 2020055619 A1 | 3/2020 |

OTHER PUBLICATIONS

US Application # U.S. Appl. No. 17/268,963 Office Action dated Jul. 27, 2023.
CN Application 201980060149X Office Action dated Nov. 21, 2023.
CN Application 201980062540.3 Office Action dated Dec. 8, 2023.
International Application # PCT/US2019/049252 Search Report dated Nov. 25, 2019.
International Application # PCT/US2019/049253 Search Report dated Mar. 13, 2020.

* cited by examiner

ENHANCED DEPTH MAPPING USING VISUAL INERTIAL ODOMETRY

CROSS-REFERENCE TO RELATED APPLICATION

This application claims the benefit of U.S. Provisional Patent Application No. 62/735,864, filed Sep. 25, 2018, which is incorporated herein by reference.

FIELD OF THE INVENTION

The present invention relates generally to systems and methods for depth mapping, and particularly to depth mapping using time-of-flight sensing.

BACKGROUND

Existing and emerging consumer applications have created an increasing need for real-time three-dimensional (3D) imagers. These imaging devices, also known as depth sensors or depth mappers, enable the remote measurement of distance (and often intensity) to each point in a target scene—referred to as target scene depth—by illuminating the target scene with an optical beam and analyzing the reflected optical signal. Some systems capture a color image of the target scene, as well, and register the depth map with the color image.

A commonly-used technique to determine the distance to each point in the target scene involves transmitting one or more pulsed optical beams towards the target scene, followed by the measurement of the round-trip time, i.e. time of flight (ToF), taken by the optical beams as they travel from the source to the target scene and back to a detector array adjacent to the source.

Some ToF systems use single-photon avalanche diodes (SPADs), also known as Geiger-mode avalanche photodiodes (GAPDs), in measuring photon arrival time, or possible an array of SPAD sensing elements. In some systems, a bias control circuit sets the bias voltage in different SPADs in the array to different, respective values.

SUMMARY

Embodiments of the present invention that are described hereinbelow provide improved depth mapping systems and methods for operating such systems.

There is therefore provided, in accordance with an embodiment of the invention, imaging apparatus, including a radiation source, which is configured to emit pulsed beams of optical radiation toward a target scene. An array of sensing elements is configured to output signals indicative of respective times of incidence of photons on the sensing elements. Objective optics are configured to form a first image of the target scene on the array of sensing elements. An image sensor is configured to capture a second image of the target scene. Processing and control circuitry is configured to process the second image so as to detect a relative motion between at least one object in the target scene and the apparatus, and which is configured to construct, responsively to the signals from the array, histograms of the times of incidence of the photons on the sensing elements and to adjust the histograms responsively to the detected relative motion, and to generate a depth map of the target scene based on the adjusted histograms.

In some embodiments, the relative motion is due to a movement of the apparatus, and the processing and control circuitry is configured to filter the histograms to compensate for the movement of the apparatus. In a disclosed embodiment, the apparatus includes an inertial sensor, which is configured to sense the movement of the apparatus and to output an indication of the movement, wherein the processing and control circuitry is configured to apply the indication output by the inertial sensor in conjunction with processing the second image in detecting the movement of the apparatus.

Additionally or alternatively, the processing and control circuitry is configured, upon detecting an absence of the relative motion between the target scene and the apparatus, to extend an exposure time over which the histograms are accumulated.

In further embodiments, the relative motion includes a movement of an object in the target scene, and the processing and control circuitry is configured to filter the histograms to compensate for the movement of the object. In a disclosed embodiment, the processing and control circuitry is configured to process the second image so as to extract a trajectory of the movement of the object, and to correct the histograms for the sensing elements onto which the trajectory is imaged by the objective optics.

Additionally or alternatively, the processing and control circuitry is configured to identify edges among the histograms, and to apply the identified edges in detecting the relative motion.

There is also provided, in accordance with an embodiment of the invention, imaging apparatus, including a radiation source, which is configured to emit pulsed beams of optical radiation toward a target scene. An array of sensing elements is configured to output signals indicative of respective times of incidence of photons on the sensing elements. Objective optics are configured to form a first image of the target scene on the array of sensing elements. An image sensor is configured to capture a second image of the target scene. Processing and control circuitry is configured to process the second image so as to estimate a depth range of at least one object in the target scene, and which is configured to construct, responsively to the signals from the array, histograms of the times of incidence of the photons on the sensing elements while gating a time range one or more of the histograms responsively to the estimated depth range, and to generate a depth map of the target scene based on the adjusted histograms.

In some embodiments the second image is a color image. Additionally or alternatively, the sensing elements include single-photon avalanche diodes (SPADs).

There is additionally provided, in accordance with an embodiment of the invention, a method for imaging, which includes directing pulsed beams of optical radiation toward a target scene. The target scene is imaged onto an array of sensing elements in an imaging device. Signals are received from the sensing elements that are indicative of respective times of incidence of photons on the sensing elements. An image is captured of the target scene, and the captured image is processed so as to detect a relative motion between at least one object in the target scene and the imaging device. Responsively to the signals from the array, histograms of the times of incidence of the photons on the sensing elements are constructed. The histograms are adjusted responsively to the detected relative motion, and a depth map of the target scene is generated based on the adjusted histograms.

There is further provided, in accordance with an embodiment of the invention, a method for depth mapping, which includes directing pulsed beams of optical radiation toward a target scene and receiving signals indicative of respective times of incidence of photons reflected from the target scene on an array of sensing elements in an imaging device. Responsively to the signals from the array that are accumulated over a selected exposure time, histograms are constructed of the times of incidence of the photons on the sensing elements. An image of the target scene is captured and processed so as to detect a relative motion between an object in the target scene and the imaging device. An indication of movement of the imaging device is received from an inertial sensor. Upon detecting that the imaging device and the target scene are stationary, the exposure time over which the histograms are accumulated is increased. Upon detecting that the imaging device has moved, the histograms are filtered to correct for the movement. Upon detecting that the object has moved, the histograms are corrected for the motion of the object.

The present invention will be more fully understood from the following detailed description of the embodiments thereof, taken together with the drawings in which:

DETAILED DESCRIPTION OF EMBODIMENTS

Overview

For depth mapping with fine distance resolution, fine temporal resolution of the ToF is needed. For this purpose, averaging and multi-measurement techniques have been developed, such as time-correlated single-photon counting (TCSPC). In this technique, each measurement cycle begins with a START or synchronization signal, and concludes with a STOP signal provided by the SPAD upon arrival of the first photon in the cycle (assuming a photon arrives before the next cycle starts). A histogram of arrival times is typically built up over many cycles of this sort, and is then processed to locate the statistical peak.

These capabilities can be used in an array of processing circuits is coupled to an array of sensing elements and comprises a memory, which records the time of incidence of the photons incident on each sensing element in each acquisition period. For this purpose, the processing circuits coupled to each SPAD sensing element may comprise a respective time-to-digital converter (TDC), which increments counts in the memory of the respective times of incidence of photons on the sensing element in multiple different time bins. At the conclusion of each frame, a controller processes the histogram of the respective counts stored in the pixel memory in order to derive and output the respective time-of-arrival value for the corresponding sensing element.

ToF-based depth mappers are capable in this manner of measuring target scene depth over a large range of distances, in varying ambient light conditions. Existing depth mappers of this sort, however, suffer from high noise and low resolution. The signal/noise ratio and resolution can be improved by increasing the exposure time over which the ToF histograms are constructed—meaning that the histograms are accumulated over larger numbers of pulses of the beam or beams illuminating the target scene.

Increasing the exposure time, however, also increases the susceptibility of the depth measurements to motion artifacts. These artifacts can arise due to various sorts of relative motion between objects in the target scene and the depth mapping apparatus, including both movement of the objects in the scene and movement of the depth mapping apparatus itself. Although some motion artifacts can be inferred and corrected for by comparison among the histograms constructed at different times and locations in this scene, this approach is computationally inefficient and may be incapable of distinguishing between certain types of motion artifacts and features in the scene that give rise to similar histogram features.

The embodiments of the present invention that are described herein make use of ancillary information, i.e., information from sources other than the ToF sensing elements, in detecting relative motion between objects in the target scene and the depth mapping apparatus. In some embodiments, this ancillary information is provided by processing an additional image of the scene, such as a color video image, which is captured by an image sensor associated with the apparatus. The additional image may also provide depth information, for example using pattern-based or stereoscopic depth sensing, which can indicate motion in three dimensions. Additionally or alternatively, the ancillary information may be provided by an inertial sensor in the apparatus, which indicates whether the apparatus has moved and, if so, in what direction. This sort of combined processing of images and inertial signals is referred to a "visual inertial odometry."

Thus, embodiments of the present invention provide imaging apparatus comprising a radiation source, which emits pulsed beams of optical radiation toward a target scene, and an array of sensing elements, which output signals indicative of respective times of incidence of photons on the sensing elements, along with objective optics to image the target scene onto the array. Processing and control circuitry constructs, based on the signals from the sensing elements, histograms of the times of incidence of the photons on the sensing elements (also referred to as the "times of arrival" of the photons).

An additional image sensor captures its own image of the target scene. In some embodiments, the processing and control circuitry processes this latter image so as to detect relative motion between at least one object in the target scene and the apparatus. The processing and control circuitry adjusts the histograms on the basis of the detected motion (or lack thereof), and generates a depth map of the target scene based on the adjusted histograms. If movement of either the apparatus or an object in the scene is detected in this manner, the processing and control circuitry may filter the histograms to compensate for this movement, and can thus eliminate or at least reduce the corresponding motion artifact in the depth map. On the other hand, when an absence of relative motion is detected-meaning that both the apparatus and the target scene are stationary—the processing and control circuitry can extend the exposure time over which the histograms are accumulated and thus enhance the signal/noise ratio and precision of the depth map.

In other embodiments, the processing and control circuitry processes the additional image in order to estimate the depth range of objects in the target scene, and uses this estimated depth range in gating the time ranges of the histograms of the times of incidence of the photons. The histograms can thus be constructed with higher resolution, while ignoring artifacts that fall outside the gated range. Guidance filters, such as cross-bilateral and guided filters, which are optimized to produce a bound error (rather than minimizing the average error), can be used in this context to give a prediction of an estimated depth for each spot in every frame. These estimates can be used to filter out parts of the histogram in which a true signal is unprovable, thus giving higher detection rates.

System Description

Figure 1:
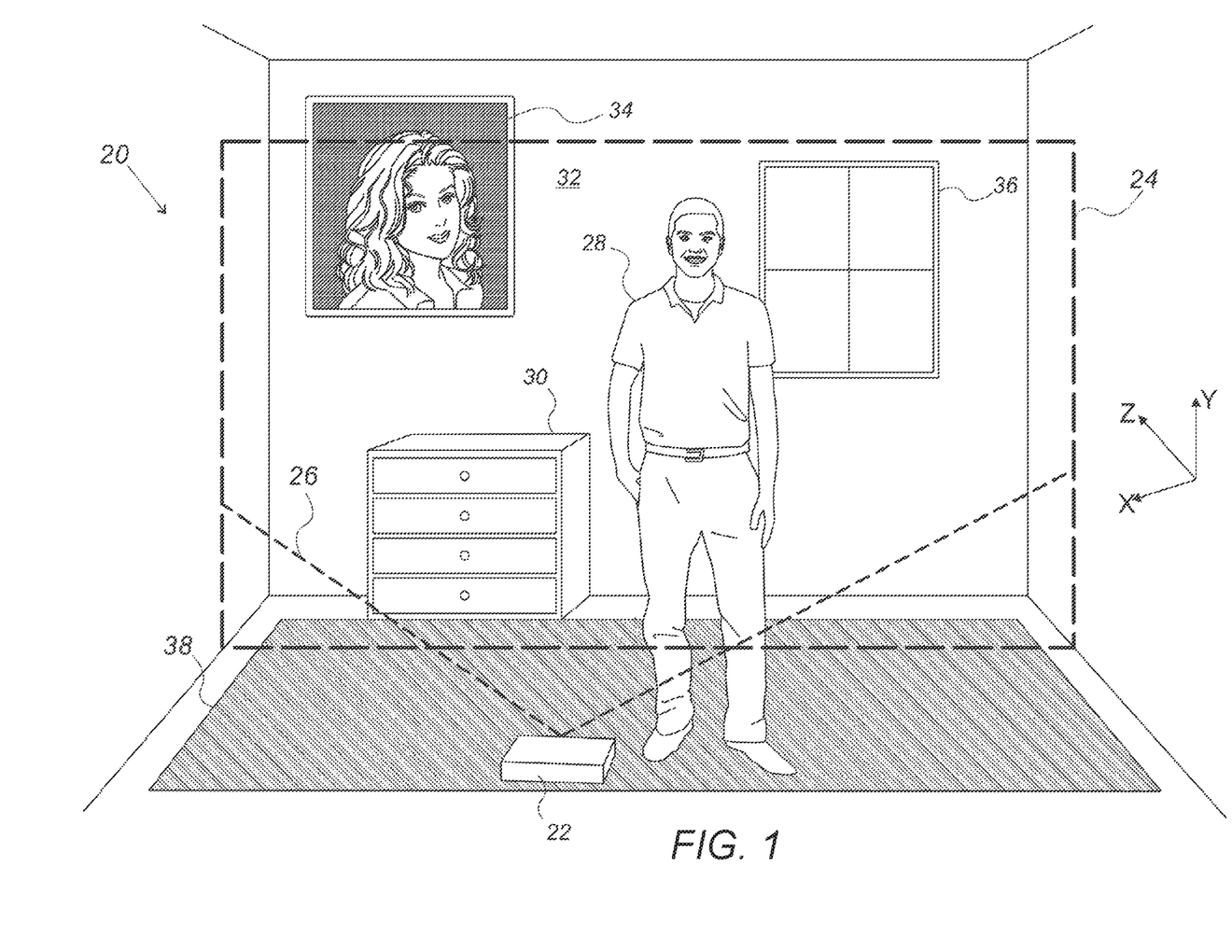
FIG. 1 is a schematic, pictorial illustration of a depth mapping system, in accordance with an embodiment of the invention.

FIG. 1 is a schematic, pictorial illustration of a depth mapping system 20, in accordance with an embodiment of the invention. In the pictured scenario, an imaging device 22 generates a depth map of a target scene 24 within a field of view 26 of the device. In this example, target scene 24 contains moving objects, such as human FIGS. 28, as well as stationary objects, including a chair 30, a wall 32, picture 34, window 36 and rug 38. Although imaging device 22 is shown in FIG. 1 as a tabletop unit, the imaging device may alternatively be a mobile or handheld device, and may thus move, as well, during acquisition of the depth map.

Imaging device 22 measures depth values by directing beams of optical radiation toward points in target scene 24 and measuring times of arrival of photons reflected from each point. The front plane of device 22 is taken, for the sake of convenience, to be the X-Y plane, and depth coordinates of points in the target scene are measured along the Z-axis. The depth map generated by imaging device 22 thus represents target scene 24 as a grid of points in the X-Y plane with a depth coordinate indicating the distance measured to each point.

Figure 2:
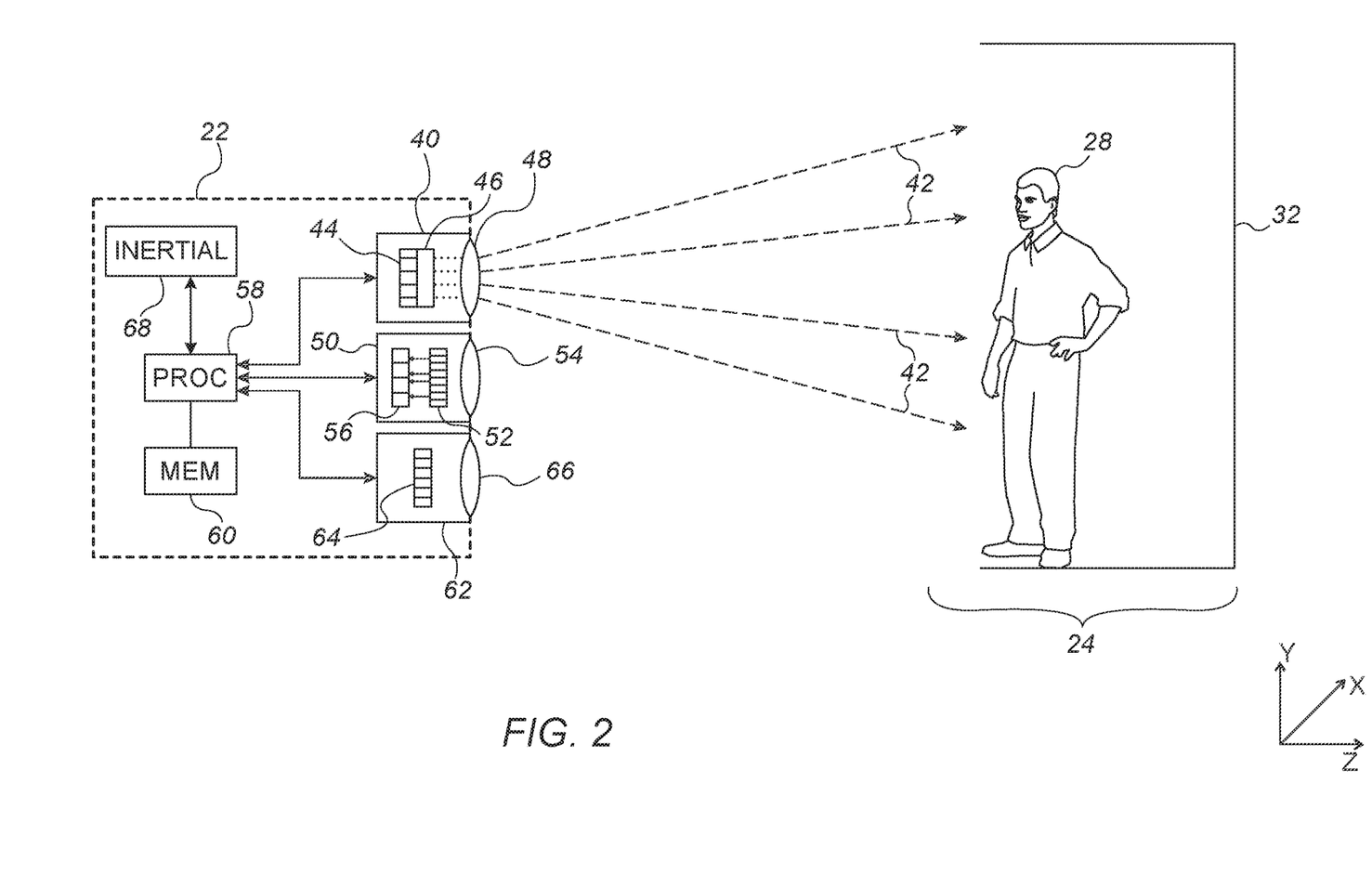
FIG. 2 is a schematic side view of the depth mapping system of FIG. 1, in accordance with an embodiment of the invention.

FIG. 2 is a schematic side view of system 20, showing details of imaging device 22, in accordance with an embodiment of the invention. These details are shown by way of example, for the sake of concreteness and clarity, to aid in understanding the operating principles of the present invention in generating depth maps and, in particular, the use of ancillary, motion-related inform in generating such depth maps. Alternatively, these principles may be applied in other sorts of systems with suitable depth mapping and imaging capabilities.

Imaging device 22 comprises a radiation source 40, which emits multiple pulsed beams 42 of optical radiation toward target scene 24. The term "optical radiation" is used in the present description and in the claims to refer to electromagnetic radiation in any of the visible, infrared and ultraviolet ranges, and may be used interchangeably with the term "light" in this context. In the present example, radiation source 40 comprises a two-dimensional array 44 of vertical-cavity surface-emitting lasers (VCSELs), which are driven to emit sequences of short pulses of optical radiation. A diffractive optical element (DOE) 46 can optionally be used to replicate the actual beams emitted by the VCSELs in array 44 so as to output a larger number of beams 42 (for example, on the order of 500 beams) at different, respective angles from radiation source 40. A collimating lens 48 projects beams 42 toward target scene 24.

A receiver 50 (also referred to as a "depth camera") in imaging device comprises a two-dimensional array 52 of sensing elements, such as SPADs or avalanche photodiodes (APDs), which output signals indicative of respective times of incidence of photons on the sensing elements. Objective optics 54 form an image of target scene 24 on array 52. Processing units 56 are coupled to groups of mutually-adjacent sensing elements, which are referred to herein as "super-pixels," and process together the signals from the sensing elements in each of the super-pixels in order to generate a measure of the times of arrival of photons on the sensing elements in the group following each pulse of beams 42. For clarity of explanation, processing units 56 are shown in FIG. 2 as separate from array 52, but in some implementations the processing units and array are integrated in a single integrated circuit device. Alternatively, each sensing element may have its own, dedicated processing unit.

Processing units 56 comprise hardware amplification and logic circuits, which sense and record pulses output by the SPADs (or other sensing elements). Processing units 56 thus measure the times of arrival of the photons that gave rise to the pulses output by the SPADs, and possibly the strengths of the reflected laser pulses impinging on array 52. Processing units 56 may comprise time-to-digital converters (TDCs), for example, along with digital circuitry for constructing histograms of the times of arrival of photons incident on the respective sensing elements (or super-pixel groups of sensing elements) over multiple pulses emitted by the VCSELs in array 44. Processing units 56 thus output values that are indicative of the distance to respective points in scene 24, and may also output an indication of the signal strength.

Alternatively or additionally, some or all of the components of processing units 56 may be separate from array 52 and may, for example, be integrated with a control processor 58. For the sake of generality, control processor 58 and processing units 56 are collectively referred to herein as "processing and control circuitry."

Based on the histograms constructed by processing units 56, control processor 58 calculates the times of flight of the photons in each of beams 42, and thus generates a depth map comprising depth coordinates corresponding to the distances to the corresponding points in target scene 24. This mapping is based on the timing of the emission of beams 42 by radiation source 40 and from the times of arrival (i.e., times of incidence of reflected photons) measured by processing units 56. Control processor 58 stores the depth coordinates in a memory 60, and may output the corresponding depth map for display and/or further processing.

In addition to the depth sensing functionalities described above, imaging device 22 comprises a two-dimensional imaging camera 62. Camera 62 in the present example comprises an image sensor 64, such as an RGB color sensor, as is known in the art. An imaging lens 66 forms an image of target scene 24 on image sensor 64, which thus outputs an electronic image of the target scene. Because camera 62 is mounted in a fixed spatial and optical relation to receiver 50, the electronic image output by camera 62 will generally be registered with the image that is formed by objective optics 54 on array 52. Control processor 58 receives and uses the image data output by camera 62 in detecting relative motion between objects in target scene 24 and imaging device 22, and in adjusting the histograms constructed by processing units 56 in response to the detected relative motion, as described further hereinbelow.

In the pictured embodiment, imaging device 22 also comprises an inertial sensor 68, such as the sort of solid-state accelerometer that is present in most smartphones and other sorts of mobile devices. Inertial sensor 68 senses and outputs an indication of movement of imaging device 22, as is known in the art. Control processor 58 applies this indication, typically in conjunction with the image data provided by camera 62, in adjusting the histograms constructed by processing units to compensate for the movement of the imaging device. By processing the output of the inertial sensor in conjunction with the image output by camera 62, as explained further hereinbelow, control processor 58 is able to more precisely model the effect of the movement of the imaging device on the depth map, as well as distinguishing between the effects of movement of imaging device 22 and movement of objects in the target scene.

Control processor 58 typically comprises a programmable processor, which is programmed in software and/or firmware to carry out the functions that are described herein. Alternatively or additionally, controller 26 comprises hardwired and/or programmable hardware logic circuits, which carry out at least some of the functions of the control processor. Although control processor 58 is shown in FIG. 2, for the sake of simplicity, as a single, monolithic functional block, in practice the control processor may comprise a single chip or a set of two or more chips, with suitable interfaces for receiving and outputting the signals that are illustrated in the figure and are described in the text.

Methods of Operation

Figure 3:
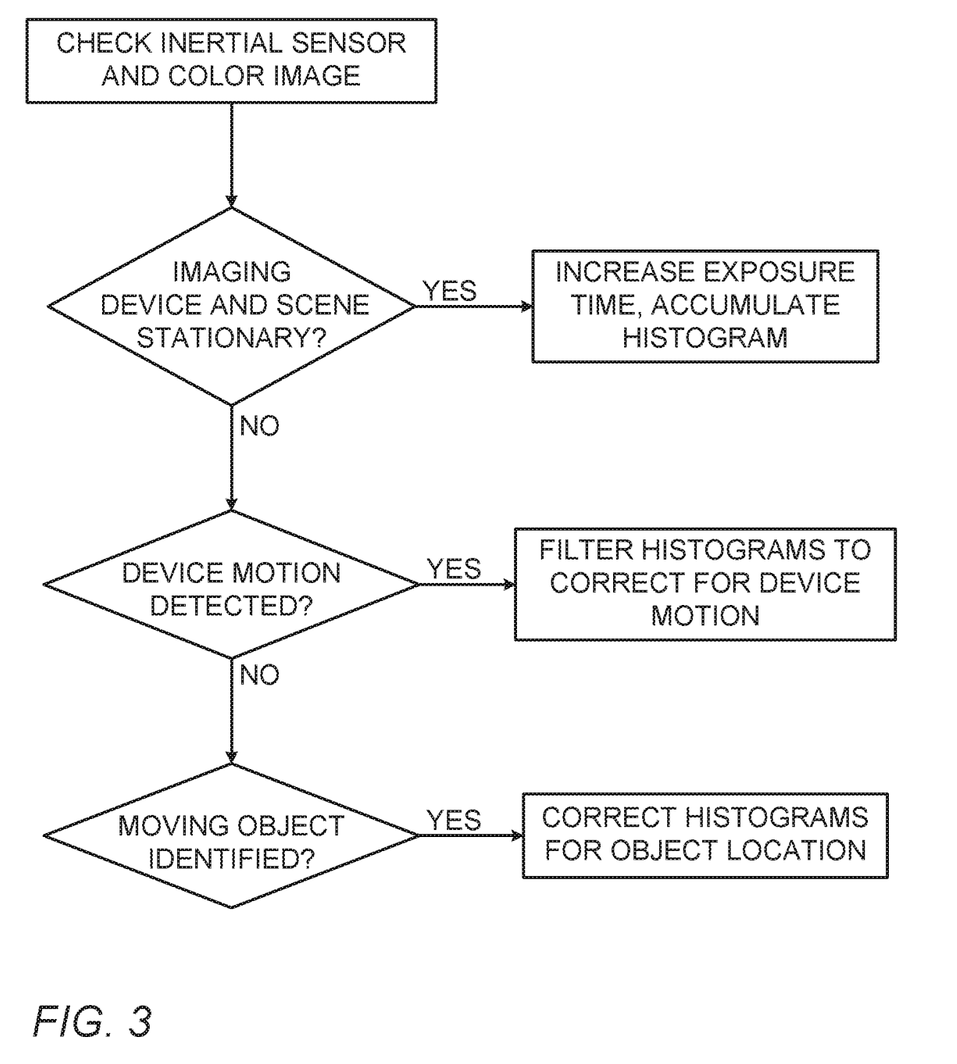
FIG. 3 is a flow chart that schematically illustrates a method for processing ToF information, in accordance with an embodiment of the invention.

FIG. 3 is a flow chart that schematically illustrates a method for processing ToF information, in accordance with an embodiment of the invention. The method is described here, for the sake of clarity and concreteness, with reference to the elements of system 20 and imaging device 22, as shown in FIGS. 1 and 2. Alternatively, the principles of the present method may be applied, mutatis mutandis, in other sorts of ToF-based depth mapping systems. Although the steps of the method of FIG. 3 are shown in a certain sequential order, in practice the steps may be carried out in parallel. Additionally or alternatively, one or more of the steps may be omitted, and the remaining steps may be performed individually or in various different subcombinations. All such alternative implementations are considered to be within the scope of the present invention.

Control processor 58 initiates the method of FIG. 3 periodically, for example following each frame of histogram data acquired by receiver (depth camera) 50. The control processor checks the output of inertial sensor 68 and processes the image output by camera 62 in order to determine whether there has been any relative motion between imaging device 22 and objects in scene 24 during the current frame. For example, control processor 58 may compare the locations of the objects in the current frame to the same objects in a previous frame in order to determine whether their locations have changed, and if so may compare the object motion to the camera motion indicated by inertial sensor 68 to ascertain whether the changes in object location are due to the motion of the objects or of the camera. Alternatively, this step may be based solely on processing of the image from camera 62 and finding that there has been no change relative to the image captured in the previous frame.

When no motion at all is detected at this step, control processor 58 may decide to extend the exposure time over which the histograms are accumulated. For example, control processor 58 may instruct processing units 56 to continue accumulating photon times of arrival and constructing the respective histograms over an additional frame or multiple frames. Alternatively, control processor 58 may read out and sum successive histograms in memory 60. In either case, the signal/noise ratio of the resulting histograms will generally increase as the square root of the exposure time, thus enhancing the accuracy of the depth coordinates that can be extracted from the histograms.

Otherwise, control processor 58 checks whether the motion detected in the image output by camera 62 is due to motion of imaging device 22 or motion in scene 24. The signal from inertial sensor 68 provides a reliable indicator in this regard. Additionally or alternatively, control processor 58 can compute an optical flow field over an image or sequence of images of scene 24 that it receives from camera 62, using image processing techniques that are known in the art for this purpose. A consistent translational and/or rotational flow over the entire field will generally be indicative of movement of imaging device 22, while local flows will define the object or objects that are moving. The effects of such movements on ToF histograms are shown in the figures that follow.

Figure 5A:
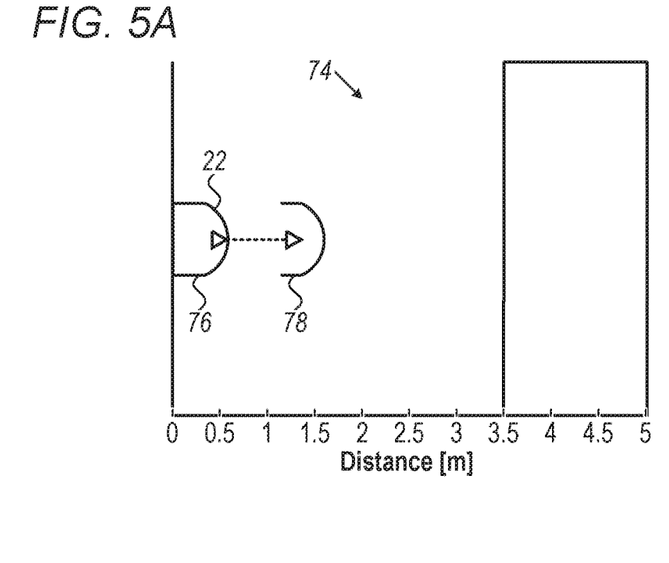
FIG. 5A is a schematic top view of a moving imaging device and a scene, which is captured in a depth map generated by the imaging device, in accordance with an embodiment of the invention.

Upon finding that imaging device 22 has moved relative to scene 24, control processor 58 can filter the histograms constructed by processing units 56 to compensate for this movement. For example, sudden movement in the Z-direction (toward or away from scene 24, in the coordinate system defined in FIGS. 1 and 2) can give rise to histograms having multiple peaks at different times of flight, whereas gradual movement will give rise to broadening of the histogram peak. (These effects are illustrated in FIGS. 5A/B and 7A/B.) In such cases, control processor 58 may be able to filter out invalid data or collapse the multiple or broadened peaks to give the correct depth values.

On the other hand, when control processor 58 identifies an object that has moved in target scene 24, it can filter the histograms to compensate for the movement of the object. For example, the control processor may process the image output by camera 62, or possibly a sequence of such images, in order to extract the trajectory of the movement of the object, and then correct the histograms for those sensing elements in array 52 onto which the trajectory is imaged by the objective optics. For example, an object moving in the Z-direction (toward or away from imaging device 22) will give rise to a sequence of histogram peaks at different depths in successive frames. An object moving transversely, i.e., in an X-Y plane (parallel to the plane of image sensor 64, as shown in FIG. 2), will give rise to a histogram peak at a certain depth coordinate that will shift across the depth map in successive frames. Once control processor 58 has identified the moving object, it can either filter out or merge the peaks at different Z-coordinates or X-Y coordinates in order to correct the sequence of frames in question. The decision as to whether to filter out or merge the histogram data depends on application requirements and the quality of the data.

Figure 4A:
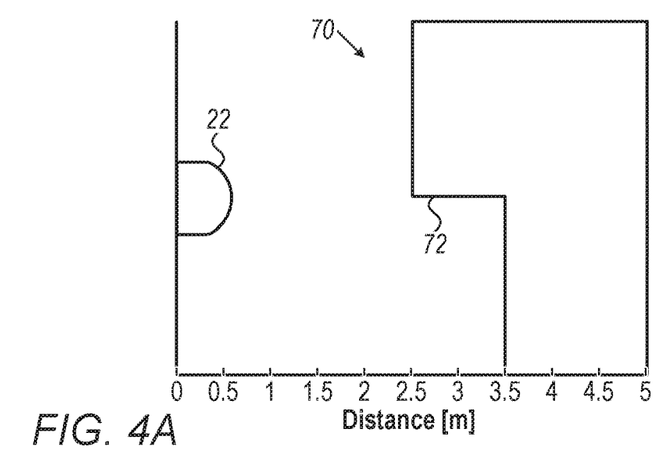
FIG. 4A is a schematic top view of a stationary imaging device and a scene containing an edge, which is captured in a depth map generated by the imaging device, in accordance with an embodiment of the invention.
Figure 4B:
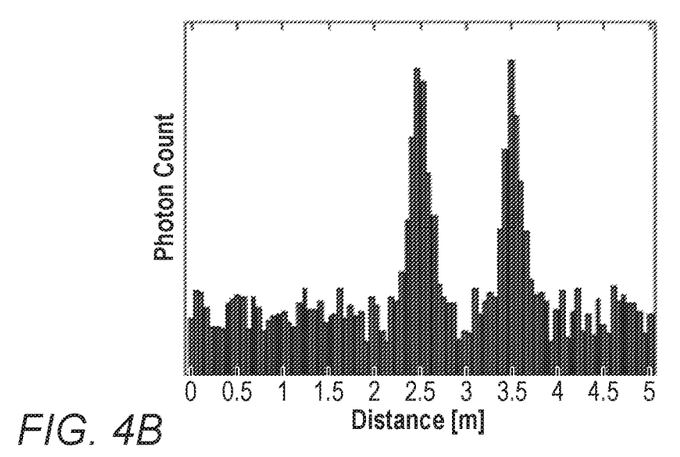
FIG. 4B is a ToF histogram captured by the imaging device of FIG. 4A at the location of the edge in the scene, in accordance with an embodiment of the invention.

Reference is now made to FIGS. 4A and 4B, which schematically illustrate the effect and mode of processing of an edge 72 in a scene 70 that is mapped by imaging device 22, in accordance with an embodiment of the invention. FIG. 4A is a schematic top view of imaging device 22 and scene 70, while FIG. 4B is a ToF histogram captured by imaging device 22 at the location of edge 72 in scene 70. Because of the finite width of the pixels in the depth map generated by imaging device 22, edge 72 manifests in this histogram as a double peak. (The pixel includes photons reflected from both sides of edge 72; thus, the photons reflected from the surface on the upper side of the edge in FIG. 4A will give one peak at a shorter distance, while those reflected from the surface on the lower side will give another peak at a longer distance.) Control processor 58 can identify and use such edges in the histograms, along with their counterpart edges in the images output by camera 62, in detecting and correcting for the relative motion between objects in the scene and imaging device 22.

Figure 5B:
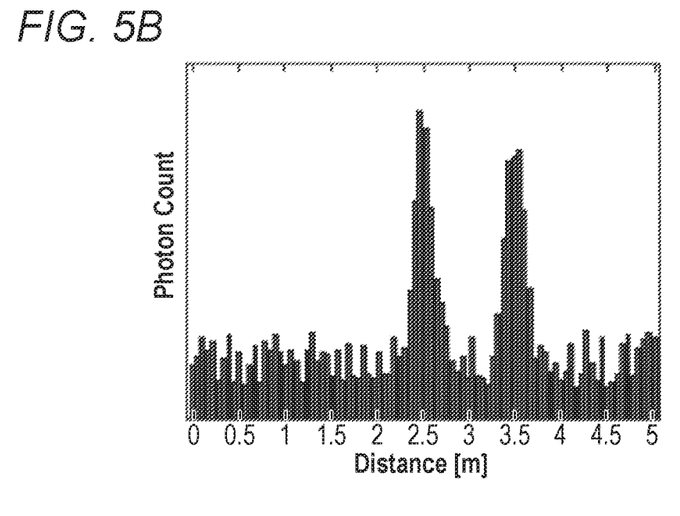
FIG. 5B is a ToF histogram captured by the imaging device of FIG. 5A, in accordance with an embodiment of the invention.

FIGS. 5A and 5B schematically illustrate the effect of sudden motion of imaging device 22 relative to a scene 74, which is captured in a depth map generated by the imaging device, in accordance with an embodiment of the invention. FIG. 5A is a schematic top view, showing movement of imaging device 22 between positions 76 and 78. FIG. 5B is a ToF histogram captured by imaging device, with two peaks corresponding to the two positions of the imaging device. Although the histogram in FIG. 5B bears a close resemblance to that in FIG. 4B, control processor 58 is able to distinguish between the two situations on the basis of edges in scene 70 that appear in the images captured by camera 62, as well as the signals output by inertial sensor 68. For example, if an edge appears in the image captured by camera 62, while inertial sensor 68 did not detect any movement, control processor 58 may conclude that the double peak in the histogram is due to an actual edge in the depth map. On the other hand, when the inertial sensor detected movement of the imaging device and/or failed to detect a corresponding edge in the image, the control will conclude that the double peak is spurious. Control processor 58 will then correct the histogram of FIG. 5B accordingly, for example by eliminating one of the two peaks or merging the two peaks into a single peak, with adjustment for the movement from position 76 to position 78.

Figure 6A:
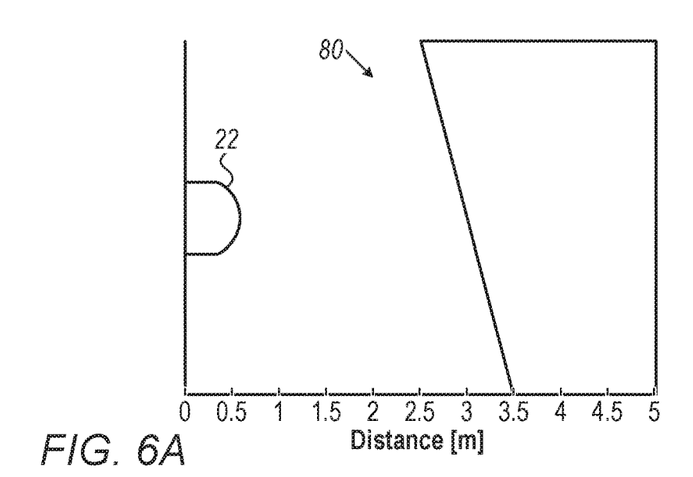
FIG. 6A is a schematic top view of a stationary imaging device and a scene of graduated depth, which is captured in a depth map generated by the imaging device, in accordance with an embodiment of the invention.
Figure 6B:
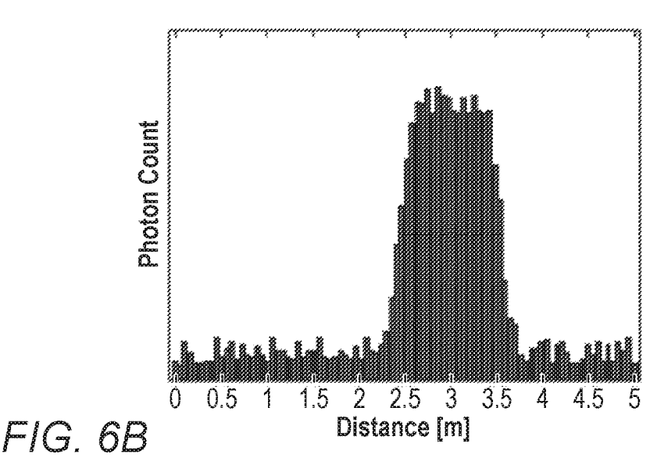
FIG. 6B is a ToF histogram captured by the imaging device of FIG. 6A, in accordance with an embodiment of the invention.

FIGS. 6A/B and 7A/B show a similar sort of comparison, in accordance with another embodiment of the invention. FIG. 6A is a schematic top view of imaging device 22 in the course of generating a depth map of a scene 80 of graduated depth, while FIG. 6B is a ToF histogram captured by imaging device 22 in this situation. In this scenario, imaging device 22 is stationary, but the peak in the histogram in FIG. 6B is broadened due to the range of depth values encompassed by the corresponding pixel in the depth map.

Figure 7A:
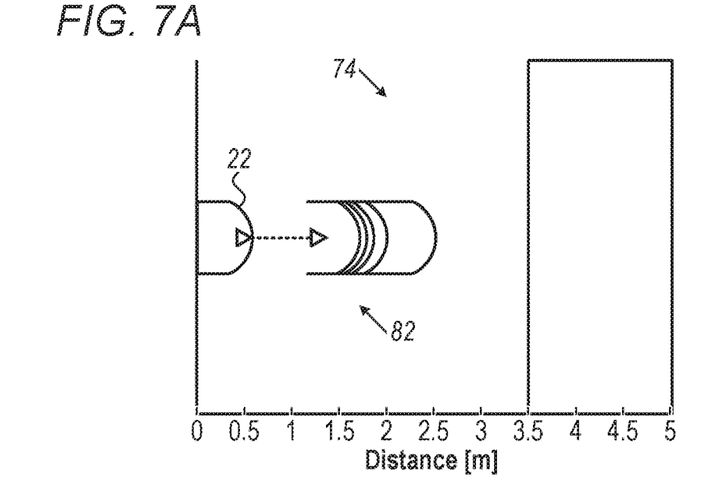
FIG. 7A is a schematic top view of a moving imaging device and a scene, which is captured in a depth map generated by the imaging device, in accordance with an embodiment of the invention.
Figure 7B:
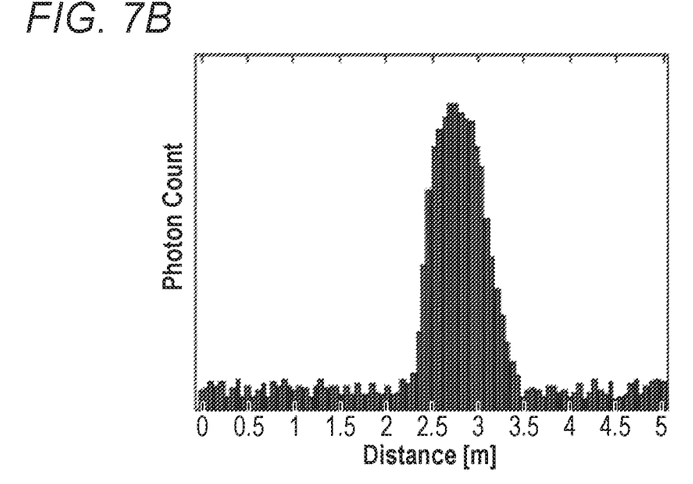
FIG. 7B is a ToF histogram captured by the imaging device of FIG. 7A, in accordance with an embodiment of the invention.

In the schematic top view of FIG. 7A, on the other hand, imaging device 22 moves gradually over a range 82 in the Z-direction, resulting similarly in a broadened peak as shown in the ToF histogram of FIG. 7B. Once again, control processor 58 is able to detect the motion of imaging device 22 based on the output of inertial sensor 68 and/or analysis of the images captured by camera 62, and is thus able to adjust and correct the histogram, for example by narrowing the spread of the histogram to compensate for the motion that was detected and compute a more precise depth value.

Although the embodiments described above relate to a particular physical configuration of device 22, the principles of the present invention may similarly be applied in other sorts of ToF-based depth mapping devices. For example, although device 22 the techniques described above may be applied in enhancing the accuracy It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An imaging apparatus, comprising:
    a radiation source, which is configured to emit pulsed beams of optical radiation toward a target scene;
    an array of sensing elements, configured to output signals indicative of respective times of incidence of photons on the sensing elements;
    objective optics configured to form a first image of the target scene on the array of sensing elements;
    an image sensor, which is configured to capture a second image of the target scene; and
    processing and control circuitry, which is configured to process the second image so as to detect a relative motion between at least one object in the target scene and the apparatus, and which is configured to construct, in response to the signals from the array, histograms of the times of incidence of the photons on the sensing elements and to adjust the histograms in response to the detected relative motion, and to generate a depth map of the target scene based on the adjusted histograms.

2. The imaging apparatus according to claim 1, wherein the relative motion is due to a movement of the apparatus, and wherein the processing and control circuitry is configured to filter the histograms to compensate for the movement of the apparatus.

3. The imaging apparatus according to claim 2, and comprising an inertial sensor, which is configured to sense the movement of the apparatus and to output an indication of the movement, wherein the processing and control circuitry is configured to apply the indication output by the inertial sensor in conjunction with processing the second image in detecting the movement of the apparatus.

4. The imaging apparatus according to claim 1, wherein the processing and control circuitry is configured, upon detecting an absence of the relative motion between the target scene and the apparatus, to extend an exposure time over which the histograms are accumulated.

5. The imaging apparatus according to claim 1, wherein the relative motion comprises a movement of an object in the target scene, and wherein the processing and control circuitry is configured to filter the histograms to compensate for the movement of the object.

6. The imaging apparatus according to claim 5, wherein the processing and control circuitry is configured to process the second image so as to extract a trajectory of the movement of the object, and to correct the histograms for the sensing elements onto which the trajectory is imaged by the objective optics.

7. The imaging apparatus according to claim 1, wherein the processing and control circuitry is configured to identify edges among the histograms, and to apply the identified edges in detecting the relative motion.

8. The imaging apparatus according to claim 1, wherein the second image is a color image.

9. The imaging apparatus according to claim 1, wherein the sensing elements comprise single-photon avalanche diodes (SPADs).

10. An imaging apparatus, comprising:
a radiation source, which is configured to emit pulsed beams of optical radiation toward a target scene;
an array of sensing elements, configured to output signals indicative of respective times of incidence of photons on the sensing elements;
objective optics configured to form a first image of the target scene on the array of sensing elements;
an image sensor, which is configured to capture a second image of the target scene; and
processing and control circuitry, which is configured to process the second image so as to estimate a depth range of at least one object in the target scene, and which is configured to construct, in response to the signals from the array, histograms of the times of incidence of the photons on the sensing elements while gating a time range one or more of the histograms in response to the estimated depth range, and to generate a depth map of the target scene based on the adjusted histograms.

11. A method for imaging, comprising:
directing pulsed beams of optical radiation toward a target scene;
imaging the target scene onto an array of sensing elements in an imaging device;
receiving signals from the sensing elements that are indicative of respective times of incidence of photons on the sensing elements;
capturing an image of the target scene;
processing the captured image so as to detect a relative motion between at least one object in the target scene and the imaging device;
constructing, in response to the signals from the array, histograms of the times of incidence of the photons on the sensing elements;
adjusting the histograms in response to the detected relative motion; and
generating a depth map of the target scene based on the adjusted histograms.

12. The method according to claim 11, wherein the relative motion is due to a movement of the imaging device, and wherein adjusting the histograms comprises filtering the histograms to compensate for the movement of the imaging device.

13. The method according to claim 12, and comprising sensing the movement of the imaging device using an inertial sensor, which outputs an indication of the movement, wherein filtering the histograms comprises applying the indication output by the inertial sensor in conjunction with processing the image in detecting the movement of the imaging device.

14. The method according to claim 11, wherein constructing the histograms comprises, upon detecting an absence of the relative motion between the target scene and the imaging device, extending an exposure time over which the histograms are accumulated.

15. The method according to claim 11, wherein the relative motion comprises a movement of an object in the target scene, and wherein adjusting the histograms comprises filtering the histograms to compensate for the movement of the object.

16. The method according to claim 15, wherein processing the image comprises extracting a trajectory of the movement of the object, and filtering the histograms comprises correcting the histograms for the sensing elements onto which the trajectory is imaged.

17. The method according to claim 11, wherein adjusting the histograms comprises identifying edges among the histograms, and applying the identified edges in detecting the relative motion.

18. The method according to claim 11, wherein the image is a color image.

19. The method according to claim 11, wherein the sensing elements comprise single-photon avalanche diodes (SPADs).

20. A method for depth mapping, comprising:
directing pulsed beams of optical radiation toward a target scene and receiving signals indicative of respective times of incidence of photons reflected from the target scene on an array of sensing elements in an imaging device;
constructing, in response to the signals from the array that are accumulated over a selected exposure time, histograms of the times of incidence of the photons on the sensing elements;
capturing an image of the target scene;
processing the captured image so as to detect a relative motion between an object in the target scene and the imaging device;
receiving from an inertial sensor an indication of movement of the imaging device;
upon detecting that the imaging device and the target scene are stationary, increasing the exposure time over which the histograms are accumulated;
upon detecting that the imaging device has moved, filtering the histograms to correct for the movement; and
upon detecting that the object has moved, correcting the histograms for the motion of the object.

* * * * *